(12) United States Patent
Itoh

(10) Patent No.: US 7,843,772 B2
(45) Date of Patent: Nov. 30, 2010

(54) CONTENT USE SYSTEM, RECORDING APPARATUS, REPRODUCING APPARATUS AND SYSTEM CONTROL METHOD

(75) Inventor: Gen Itoh, Tokyo (JP)

(73) Assignee: Sony Corporation, Tokyo (JP)

( * ) Notice: Subject to any disclaimer, the term of this patent is extended or adjusted under 35 U.S.C. 154(b) by 915 days.

(21) Appl. No.: 11/268,576

(22) Filed: Nov. 8, 2005

(65) Prior Publication Data

US 2006/0120691 A1 Jun. 8, 2006

(30) Foreign Application Priority Data

Nov. 17, 2004 (JP) ............................... 2004-332761

(51) Int. Cl.
*H04B 1/20* (2006.01)
(52) U.S. Cl. ........................................................ 369/1
(58) Field of Classification Search ................ 700/234, 700/241
See application file for complete search history.

(56) References Cited

U.S. PATENT DOCUMENTS

| 5,355,302 | A | * | 10/1994 | Martin et al. ................ 700/234 |
| 6,192,340 | B1 | | 2/2001 | Abecassis |
| 6,504,990 | B1 | | 1/2003 | Abecassis |
| D494,188 | S | * | 8/2004 | Huang ..................... D14/203.3 |
| 6,832,293 | B1 | * | 12/2004 | Tagawa et al. .............. 711/115 |
| 7,203,414 | B2 | * | 4/2007 | Taira et al. ..................... 386/95 |
| 2003/0056636 | A1 | * | 3/2003 | Fukuda ......................... 84/602 |
| 2004/0027931 | A1 | | 2/2004 | Morita |
| 2005/0157746 | A1 | * | 7/2005 | Horpestad .................... 370/463 |
| 2005/0254790 | A1 | * | 11/2005 | Ando et al. ..................... 386/95 |
| 2006/0180668 | A1 | * | 8/2006 | Casey ..................... 235/462.01 |
| 2006/0226232 | A1 | * | 10/2006 | Helkio et al. .......... 235/472.01 |

FOREIGN PATENT DOCUMENTS

| EP | 0 987 888 A1 | 3/2000 |
| GB | 2 325 537 A | 11/1998 |
| GB | 2 360 679 A | 9/2001 |
| JP | 2003-274377 | 9/2003 |
| JP | 2004-254143 | 9/2004 |
| JP | 2004-297605 | 10/2004 |
| WO | WO 2004/045221 A1 | 5/2004 |

OTHER PUBLICATIONS

Patent Abstracts of Japan, JP 2004-046959, Feb. 12, 2004.

* cited by examiner

*Primary Examiner*—Joseph H Feild
*Assistant Examiner*—Henok G Heyi
(74) *Attorney, Agent, or Firm*—Oblon, Spivak, McClelland, Maier & Neustadt, L.L.P.

(57) ABSTRACT

A recording apparatus includes a storage section that stores content data. The recording apparatus additionally includes a reproduction history information acquisition section that acquires reproduction history information about the content data from a portable reproducing apparatus. The recording apparatus further includes a content data extraction section that extracts one or more pieces of content data from the content data stored in the storage section in accordance with a reproduction start time included in the reproduction history information. The reproduction start time corresponds to a time at which a reproduction of the content data was started. The recording apparatus additionally includes a content data transfer section that transfers the extracted content data to the portable reproducing apparatus.

11 Claims, 10 Drawing Sheets

| GENRE | PROGRAM NAME | CAST | KEYWORD 1 | KEYWORD 2 |
|---|---|---|---|---|
| DRAMA | YYYY | XXX・・・ | | |
| SPORTS | | | BASEBALL | baseball |
| NEWS | NEWS XXX | | | |
| NEWS | NEWS YY | | | |
| | | | TRAVEL | |
| | | | | |

| FILE NAME / RECORDING DATE/TIME | BROADCAST CHANNEL | GENRE | PROGRAM NAME | CAST | KEYWORD |
|---|---|---|---|---|---|
| DATA 1.video / OCT.19,2004 22:00-22:55 | CHANNEL 8 | NEWS | NEWS XXX | ZZ--- | |
| DATA 2.video / OCT.19,2004 23:30-0:30 | CHANNEL 10 | SPORTS | SPORTS NEWS | | |
| DATA 3.video / OCT.20,2004 21:00-21:55 | CHANNEL 1 | DRAMA | YYY | XX--- | |
| DATA 4.video / OCT.21,2004 19:30-19:55 | CHANNEL N | VARIETY | TRAVEL TO AA | | TRAVEL |
| ⋮ | ⋮ | ⋮ | ⋮ | ⋮ | ⋮ |

FIG. 8

| 31 | CHILD APPARATUS TAKE-OUT TIME | USE TIME TTL(min) | NEWS (min) | VARIETY (min) | DRAMA (min) | MUSIC (min) | USE TIME SLOT 1 | USE TIME SLOT 2 | ... |
|---|---|---|---|---|---|---|---|---|---|
| MON | 7:31 | 105 | 15 | 45 | 0 | 45 | 7:50~8:05 | 12:10~12:55 | ... |
| TUE | 7:30 | 120 | 15 | 0 | 45 | 60 | 7:50~8:05 | | ... |
| WED | 7:30 | 60 | 15 | 0 | 0 | 45 | 7:50~8:05 | | ... |
| THU | 7:20 | 100 | 15 | 40 | 45 | 0 | 7:50~8:05 | 12:05~12:45 | ... |
| FRI | 7:35 | 130 | 15 | 45 | 0 | 70 | 7:50~8:05 | 12:05~12:50 | ... |
| SAT | 10:10 | 160 | 0 | 0 | 0 | 160 | 13:30~14:20 | 17:00~18:20 | ... |
| SUN | 10:00 | 30 | 0 | 30 | 0 | 0 | 10:00~10:30 | | ... |

| GENRE | FRESHNESS | STORAGE |
|---|---|---|
| NEWS | 0.5 | 0.1 |
| SPORTS | 1.2 | 0.4 |
| VARIETY | 2.5 | 3.5 |
| MUSIC | 3 | 7 |

| DATE OF REPRODUCTION | TOTAL REPRODUCTION TIME(min) | REPRODUCTION FILE NAME | REPRODUCTION TIME(min) | REPRODUCTION TIME SLOT |
|---|---|---|---|---|
| OCT. 20 (WED) | 60 | DATA X.video<br>DATA Y.audio<br>DATA Z.audio | 15<br>30<br>15 | 7:50~8:05<br>12:10~12:40<br>12:40~12:55 |
| OCT. 21 (THU) | 100 | DATA W.video<br>⋮ | 15<br>⋮ | 7:50~8:05 |
| ⋮ | ⋮ | ⋮ | ⋮ | ⋮ |

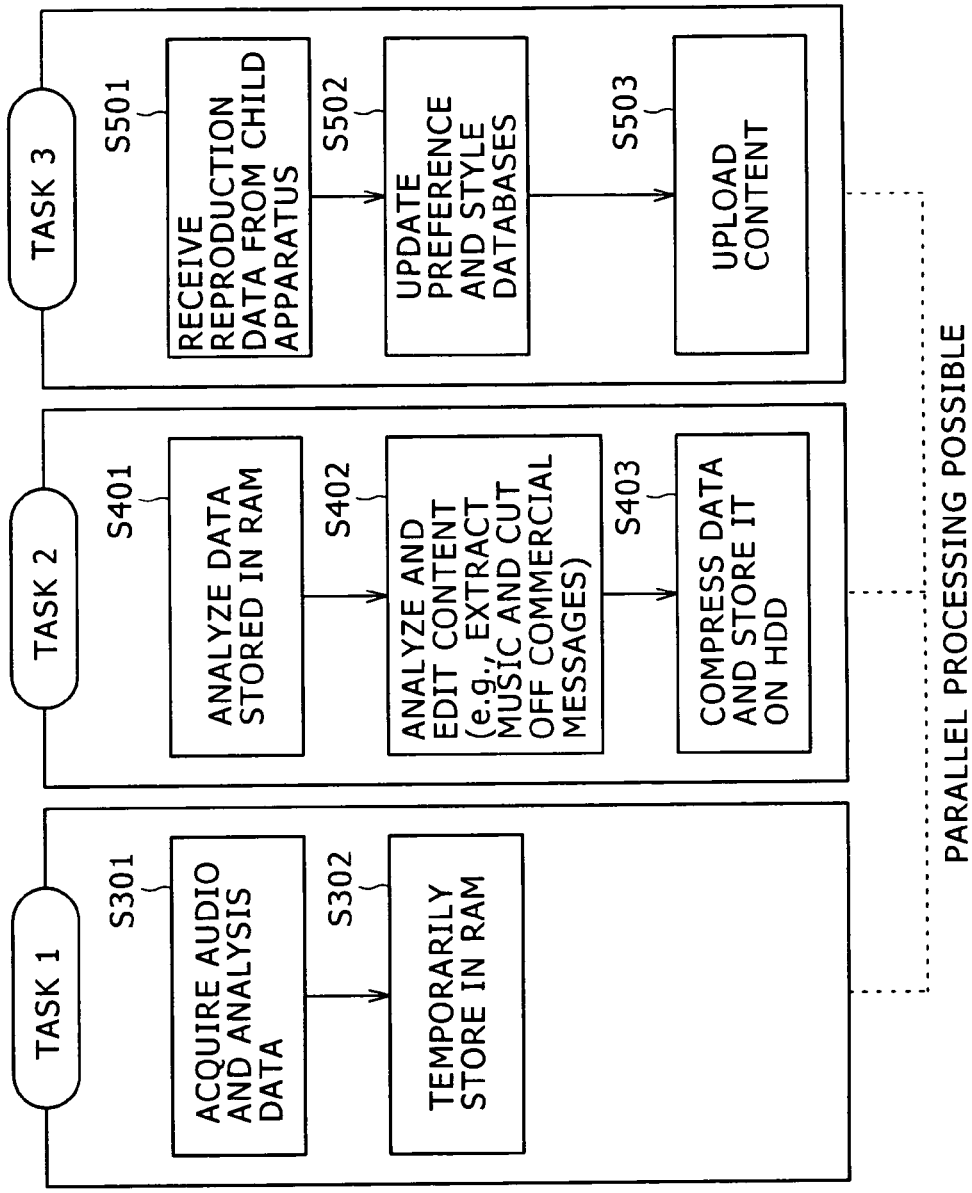

CONTENT USE SYSTEM, RECORDING APPARATUS, REPRODUCING APPARATUS AND SYSTEM CONTROL METHOD

CROSS REFERENCES TO RELATED APPLICATIONS

The present invention contains subject matter related to Japanese Patent Application JP 2004-332761 filed in the Japanese Patent Office on Nov. 17, 2004, the entire contents of which being incorporated herein by reference.

BACKGROUND OF THE INVENTION

The present invention relates to a content use system that includes a recording apparatus, which has a large-capacity recording medium such as a hard disk, and a content reproducing apparatus such as a portable information terminal, a recording apparatus for use in the content use system, a reproducing apparatus for use in the content use system, and a system control method for use in the content use system.

Due to a HDD (Hard Disk Drive) capacity increase, there is a recording apparatus for recording a large amount of data onto a HDD from a TV or radio broadcast or CD (Compact Disc) or other medium. Such a recording apparatus, which uses a large-capacity recording medium, offers a useful function for enabling the user to record a desired broadcast (content) through the use of the information contained in an EPG (Electronic Program Guide), which can be obtained from a broadcast or the Internet.

Although a small-size HDD is made available, it is still too large to carry around. Therefore, some users note various pieces of content that are recorded on the HDD, transfer only desired pieces of content to a small-size recording medium, and use the transferred pieces of content in an outdoor location or a location away from home or office with a reproducing apparatus for the small-size recording medium.

Japanese Patent Application JP 2004-046959 proposed a method for performing an equalizing process, reverb process, echo process, noise addition process, and/or other process on the musical content to be recorded on a HDD, compressing the musical content, and recording the compressed musical content on the HDD. The musical content recorded on the HDD in the above manner can be transferred to a small-size magnetooptical disk called an MD (Mini Disc (registered trademark)) and used with an MD player under desired conditions at all times.

When the technology disclosed by Japanese Patent Application JP 2004-046959 is used, the musical content transferred from a HDD to an MD can always be reproduced by an MD player under desired conditions for enjoyment without having to make any special adjustments. Various technologies are worked out for making effective use of a large number of various pieces of content that can be stored on the HDD.

SUMMARY OF THE INVENTION

In addition to an MD, recordable CD, and other similar recording medium, some recently marketed reproducing apparatus uses a flash memory or other semiconductor memory, which is called a memory card, as a recording medium. However, semiconductor memories such as flash memories have a smaller capacity than HDDs and cannot record the entire content stored on a HDD.

Therefore, the user notes a large number of pieces of content recorded on the user's HDD and transfers only desired pieces of content to a memory card in which a semiconductor memory is used. However, it is troublesome to change the transferred pieces of content. It is therefore conceivable that many users repeatedly use the same pieces of content without changing them.

The user can store a large amount of content on a HDD-based recording apparatus. However, the user uses such a large amount of content at home where the recording apparatus is located. If the user wants to use the content stored on the HDD while the user is away from home, the user has to transfer desired pieces of content to a flash memory or other storage device having a small storage capacity.

The user wants to store a large number of pieces of content because the user does not want the same pieces of content (information) to be repeated. It does not mean that the user wants to record a large amount of content (information). Therefore, if the recorded pieces of content are updated before or immediately after the user uses the whole content recorded on the memory card, the user can receive the same service as in a case where a large number of pieces of content are stored no matter whether the employed reproducing apparatus uses a small-capacity memory card as a recording medium.

The present invention has been made in view of the above circumstances and provides a system, apparatuses, and method for combining a recording apparatus, in which a HDD or other large-capacity recording medium is used, with a reproducing apparatus such as a portable information terminal, and enabling the user to select desired information from a large amount of available information and use the desired information while constantly updating it without having to perform a complicated procedure.

In solving the above problems, according to an embodiment of the present invention, there is provided a content use system that includes a recording apparatus, which store content data and a portable reproducing apparatus which reproduces the content data transferred from the recording apparatus. The recording apparatus includes storage means for storing the content data; reproduction history information acquisition means for acquiring reproduction history information about the content data from the portable reproducing apparatus; content data extraction means for extracting one or more pieces of content data from the content data stored in the storage means in accordance with the reproduction history information; and content data transfer means for transferring the extracted content data to the portable reproducing apparatus. The portable reproducing apparatus includes content data acquisition means for acquiring the content data transferred from the recording apparatus; reproduction history information generation means for generating reproduction history information in accordance with the reproduction of the acquired content data; and reproduction history information transfer means for transferring the generated reproduction history information to the recording apparatus.

According to another embodiment of the present invention, there is provided a recording apparatus for transferring stored content data to a portable reproducing apparatus. The recording apparatus includes storage means for storing content data; reproduction history information acquisition means for acquiring the reproduction history information about the content data from the portable reproducing apparatus; content data extraction means for extracting one or more pieces of content data from the content data stored in the storage means in accordance with the reproduction history information; and content data transfer means for transferring the extracted content data to the portable reproducing apparatus.

According to a further embodiment of the present invention, there is provided a portable reproducing apparatus for reproducing content data that is transferred from a recording apparatus. The portable reproducing apparatus includes content data acquisition means for acquiring the content data transferred from the recording apparatus; reproduction history information generation means for generating reproduction history information in accordance with the reproduction of the content data; and reproduction history information transfer means for transferring the generated reproduction history information to the recording apparatus. In the portable reproducing apparatus, the content data acquisition means may further acquire content data that is extracted from the recording apparatus in accordance with the reproduction history information.

According to a still further embodiment of the present invention, there is provided a system control method for use in a content use system that includes a recording apparatus for storing content data and a portable reproducing apparatus for reproducing the content data transferred from the recording apparatus. The system control method includes the steps of causing the recording apparatus to control the storage of content data; causing the recording apparatus to acquire the reproduction history information about the content data from the portable reproducing apparatus; causing the recording apparatus to extract one or more pieces of content data from the stored content data in accordance with the reproduction history information; causing the recording apparatus to transfer the extracted content data to the portable reproducing apparatus. The system control method further includes the steps of causing the portable reproducing apparatus to acquire the content data transferred from the recording apparatus; causing the portable reproducing apparatus to generate reproduction history information in accordance with the reproduction of the acquired content data; and causing the portable reproducing apparatus to transfer the generated reproduction history information to the recording apparatus.

The present invention makes it possible to automatically store favorite content without requiring the user to perform a complicated procedure, automatically transfer up-to-date content matching the use style to the reproducing apparatus, which serves as the child apparatus, and use the transferred content through the reproducing apparatus, which serves as the child apparatus. This eliminates a problem in which a target broadcast program is recorded but cannot be viewed due to limited available time. Further, the user can properly transfer target content to the reproducing apparatus without performing a complicated procedure, and use the transferred content through the reproducing apparatus.

BRIEF DESCRIPTION OF THE DRAWINGS

FIG. 6 illustrates a preference database;

FIG. 7 illustrates recording history data;

FIG. 8 illustrates a time database;

FIG. 9 illustrates a program-related database;

FIG. 10 illustrates reproduction data;

FIG. 13 illustrates tasks that are executed by the hard disk recording apparatus.

DETAILED DESCRIPTION OF THE PREFERRED EMBODIMENTS

A system, apparatuses, and method according to an embodiment of the present invention will now be described with reference to the accompanying drawings.

[System Configuration Overview]

Figure 1:
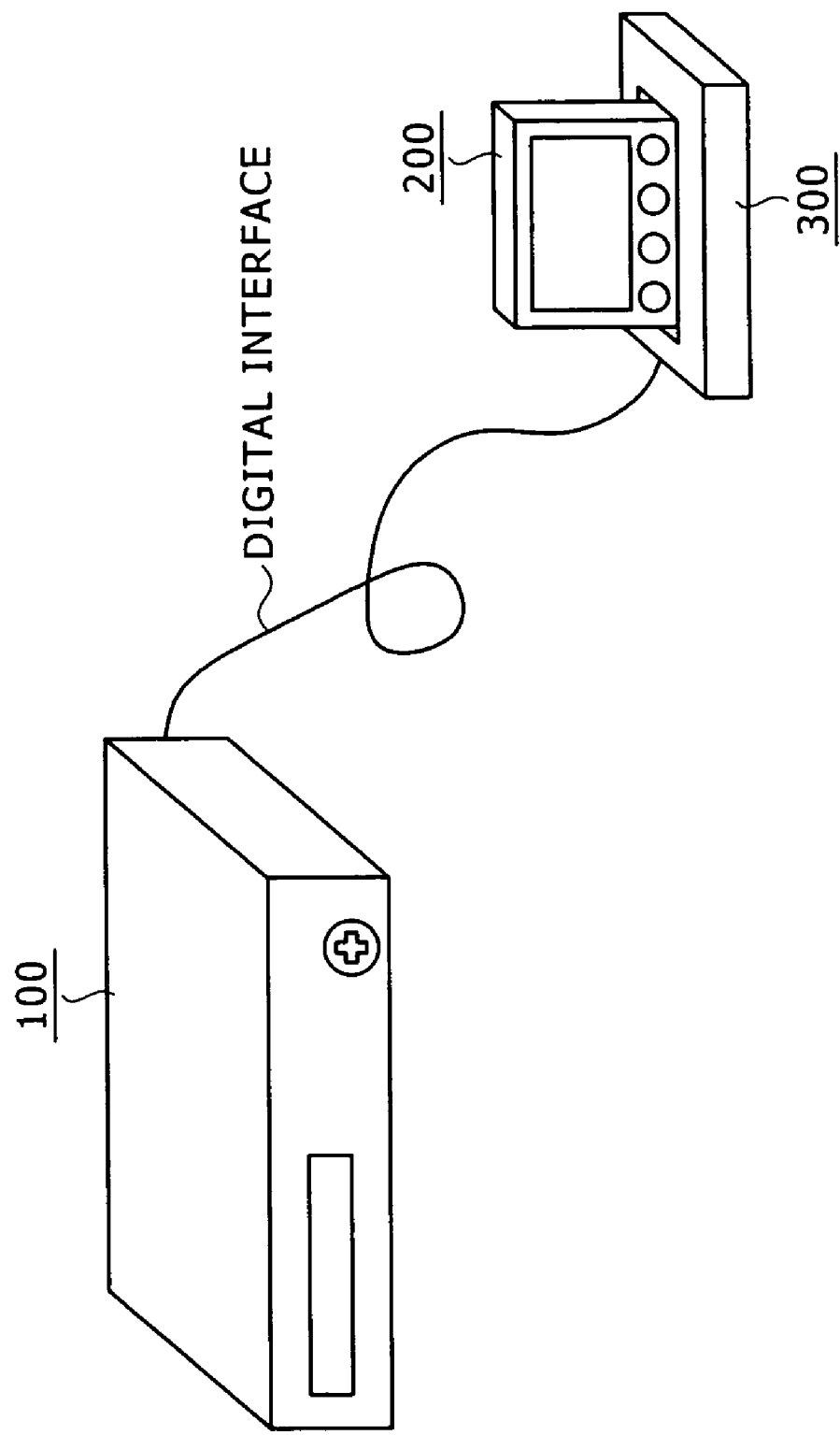
FIG. 1 illustrates the configuration of a content use system to which a system according to one embodiment of the present invention is applied.

FIG. 1 illustrates the configuration of a content use system according to the present embodiment. The content use system and system use method according an embodiment of the present invention is applied to the content use system according to the present embodiment.

As shown in FIG. 1, the system according to the present embodiment includes a hard disk recording apparatus 100, which serves as a parent apparatus, and a portable information terminal 200, which serves as a child apparatus. The system and method according to an embodiment of the present invention is applied to this system. The recording apparatus according to an embodiment of the present invention is applied to the hard disk recording apparatus 100. The reproducing apparatus according to an embodiment of the present invention is applied to the portable information terminal 200.

As indicated in FIG. 1, the hard disk recording apparatus 100 is connected to the portable information terminal 200 via a cradle 300 and a digital interface. When the portable information terminal 200 is set (placed) on the cradle 300, the child apparatus connection end of the hard disk recording apparatus 100 is connected to the parent apparatus connection end of the portable information terminal 200. Further, various data can be exchanged between the hard disk recording apparatus 100 and portable information terminal 200 via the digital interface and cradle 300.

As described in detail later, the hard disk recording apparatus 100 includes a broadcast signal tuner, and can automatically receive and select a user's favorite broadcast program in accordance with preference database information and program table data, and record (store) the received broadcast program on a hard disk. The preference database information is used as tuning instruction information that is updated in accordance with reproduction history information, which is supplied from the portable information terminal 200. The program table data is used as broadcast schedule information that is provided in the form of an EPG or the like.

The hard disk recording apparatus 100 analyzes the reproduction history information supplied from the portable information terminal 200. As described in detail later, the hard disk recording apparatus 100 can generate style database information, which indicates the use style of the portable information terminal 200, note broadcast programs stored on the hard disk, and in accordance with the generated style database information, automatically supply to the portable information terminal 200 a broadcast program that is highly likely to be used.

Thus, the portable information terminal 200 can generate a content use history whenever content is reproduced, and supply the generated content use history to the hard disk recording apparatus 100.

Data is automatically exchanged between the hard disk recording apparatus 100 and portable information terminal 200 when the portable information terminal 200 is set on the cradle 300. Therefore, the user of the system can automatically select favorite broadcast programs to store them on the hard disk without performing a complicated procedure, select a necessary broadcast program from the stored broadcast programs, transfer the selected broadcast program to a memory in the portable information terminal 200, and use the transferred broadcast program.

[Hard Disk Recording Apparatus Configuration]

Figure 2:
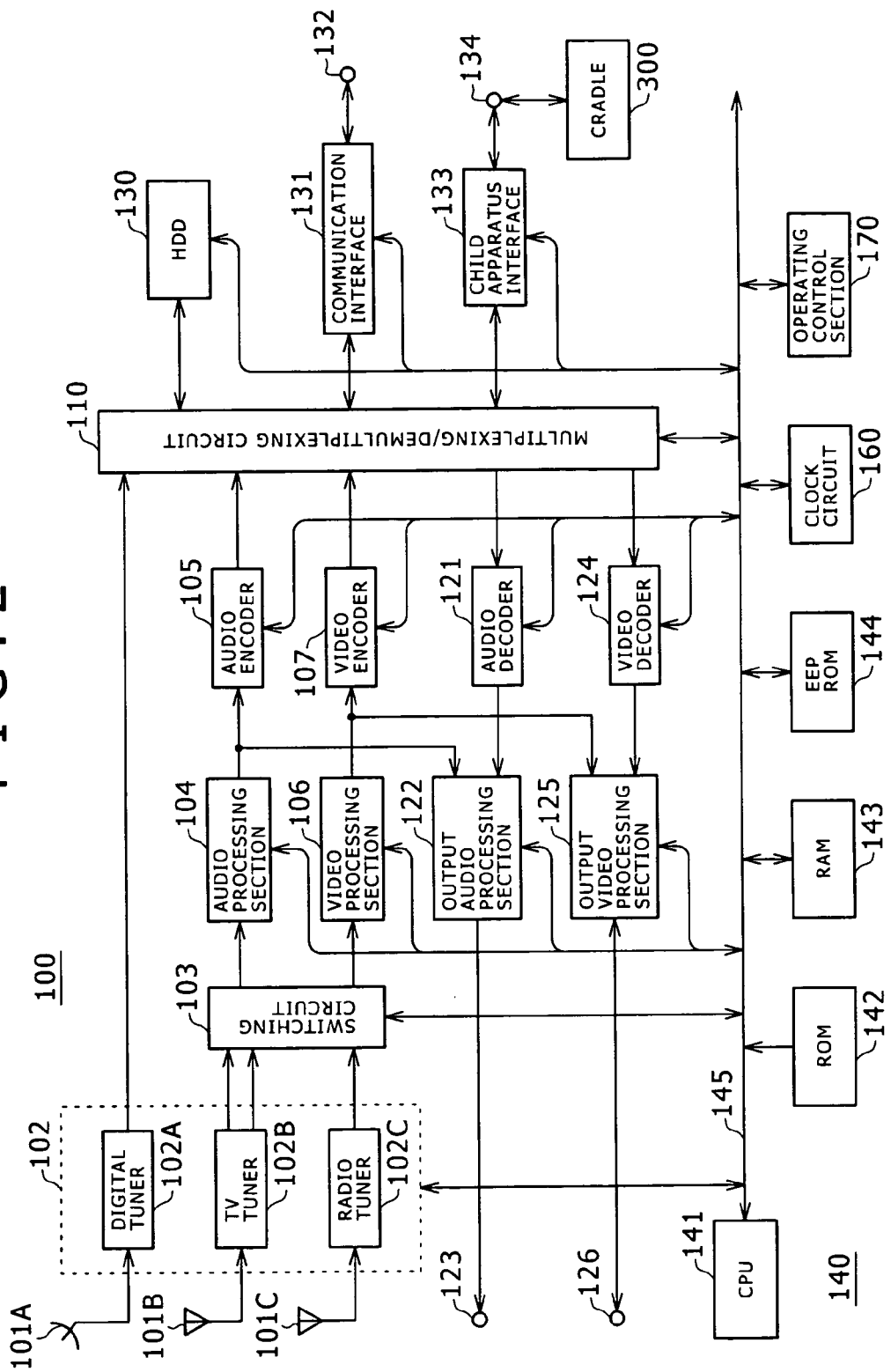
FIG. 2 is a block diagram illustrating a hard disk recording apparatus to which a recording apparatus according to one embodiment of the present invention is applied.

FIG. 2 is a block diagram illustrating the configuration of the hard disk recording apparatus 100, which is included in the system according to the present embodiment. As shown in FIG. 2, the hard disk recording apparatus 100 according to the present embodiment includes a tuner section 102, which constitutes an input system and includes a digital tuner 102A, an analog TV tuner 102B, and a radio tuner 102C. Broadcast reception antennas 101A, 101B, 101C are connected to these tuners. The TV tuner 102B and radio tuner 102C are provided with a switching circuit 103, an audio processing section 104, an audio encoder 105, a video processing section 106, and a video encoder 107.

As output system components, the hard disk recording apparatus 100 includes an audio decoder 121, an output audio processing section 122, an audio output terminal 123, a video decoder 124, an output video processing section 125, and a video output terminal 126. The hard disk recording apparatus 100 also includes a multiplexing/demultiplexing circuit 110 to perform a data multiplexing/demultiplexing process, and a hard disk drive (HDD) 130 having a 250-megabyte or larger hard disk.

As input/output system components, the hard disk recording apparatus 100 includes a communication interface 131 and a connection terminal 132, which are used for connecting to the Internet or other wide-area network, and a child apparatus interface 133 and a terminal 134, which are used for connecting to the child apparatus.

Further, the hard disk recording apparatus 100 includes a control section 140, which controls various sections according to the present embodiment. As shown in FIG. 2, the control section 140 is a microcomputer in which a CPU (Central Processing Unit) 141, a ROM (Read Only Memory) 142, a RAM (Random Access Memory) 143, and an EEPROM (Electrically Erasable and Programmable ROM) 144 are interconnected via a CPU bus 145. The control section 140 is connected to a clock circuit (timer) 160, which supplies the current time and is capable of counting the time during a certain period, and an operating control section 170, which includes various operating control keys, switches, and knobs and receives various operating control inputs (instruction inputs) from the user.

[Recording Operation]

The content recording operation performed by the hard disk recording apparatus 100 will now be described. As shown in FIG. 2, the tuner section 102 of the hard disk recording apparatus 100 according to the present embodiment has three tuners for receiving and selecting three different broadcast waves. One of the three tuners is selected by a user's operating control input, which is received via the operating control section 170, and the control operation performed by the control section 140 in accordance with preference database information, which will be described later.

[When the Digital Tuner is Used]

A case where the digital tuner 102A is used will now be described. In the present embodiment, the digital tuner 102A is a digital BS/CS tuner, which can receive and select a BS digital broadcast signal and CS digital broadcast signal. When a tuner for terrestrial digital TV broadcasts is furnished, a terrestrial digital TV broadcast signal can also be received and selected. The processing operation performed for terrestrial digital TV broadcast signal reception/selection is not described herein because it is roughly the same as for BS/CS digital broadcast signal reception/selection.

A digital broadcast signal from a satellite is received by reception antenna 101A and supplied to the digital tuner 102A. In accordance with a tuning control signal based on a user's tuning instruction, which is supplied from the control section 140, the digital tuner 102A receives and selects a target digital broadcast signal, and supplies the received and selected digital broadcast signal to the multiplexing/demultiplexing circuit 110.

For digital broadcast signal transmission purposes, video data, audio data, and various other data constituting a broadcast program as well as tuning information called PSI (Program Specific Information), EPG (Electronic Program Guide) data for formulating an electronic program guide table, and various other control data are formed into a packet, multiplexed, and transmitted on a channel, which serves as a program transmission path. In other words, the digital broadcast signal is transmitted in the form of a TS (Transport Stream) signal.

An identifier (ID) is attached to each packet. The identifier is used to extract PSI data and EPG data as well as a video packet and audio packet that constitute a broadcast program.

The multiplexing/demultiplexing circuit 110 extracts PSI and EPG data from a TS signal, which is supplied from the digital tuner 102A, and supplies the extracted data to the control section 140 to permit program selection. Further, the multiplexing/demultiplexing circuit 110 formulates an electronic program guide table, and outputs it to display it in compliance with a user's instruction, thereby making it possible, for instance, to select a broadcast program and perform programmed recording through the electronic program guide table.

When the recording of a selected program is specified, the multiplexing/demultiplexing circuit 110 extracts the video and audio packets of a user-selected target program from the TS signal supplied from the digital tuner 102A, formulates a new TS signal, which includes the extracted packets and necessary control data, supplies the new TS signal to the HDD 130, and records it on the hard disk.

At the same time, the multiplexing/demultiplexing circuit 110 formulates a video ES (Elementary Stream) from the video packet of the target program, which is extracted from the TS signal supplied from the digital tuner 102A, and supplies the video ES to the video decoder 124. Further, the multiplexing/demultiplexing circuit 110 formulates an audio ES (Elementary Stream) from the audio packet and supplies the audio ES to the audio decoder 121.

The audio decoder 121 performs a decoding process on the supplied audio ES to obtain baseband audio data, and supplies the baseband audio data to the output audio processing section 122. The video decoder 124 performs a decoding process on the supplied video ES to obtain baseband video data, and supplies the baseband video data to the output video processing section 125.

The audio ES and video ES are subjected to an MPEG (Moving Picture Expert Group) data compression process. In the audio decoder 121 and video decoder 124, an MPEG decoding process is performed.

The output video processing section 125 switches between the video data supplied from the video decoder 124 and the video data supplied from the video processing section 106, which will be described later, performs screen synthesis, filtering, and other processes, converts the resulting processed video data to an analog signal, and supplies the obtained analog signal to an external monitor display or like device via the video signal output terminal 126.

An OSD (On Screen Display) processing section can be positioned after the output video processing section 125 to generate on-screen display graphics and text data, perform a process, for instance, for superposing the generated graphics and text data over the video data supplied to the OSD processing section or displaying the generated graphics and text data within a limited area, and formulate an analog video signal in an intended output format.

Meanwhile, the output audio processing section 122 switches between the audio data supplied from the audio decoder 121 and the audio data supplied from the audio processing section 104, performs processes such as a filtering process, fading process, and speech velocity conversion process, converts the resulting processed audio data to analog audio signal, and outputs the analog audio signal to an external speaker or the like via the analog audio signal output terminal 123.

As described above, in the hard disk recording apparatus 100 according to the present invention, the video and audio data of a target program can be extracted from a digital broadcast signal that is received and selected via the digital tuner 102A, and recorded on the hard disk in the HDD 130. At the same time, the analog video signal and analog audio signal can be formulated and output. In other words, the target program, which is supplied in the form of a digital broadcast signal, can be viewed while it is recorded on the hard disk in the HDD 130.

Further, the TS signal, which is newly formulated in the multiplexing/demultiplexing circuit 110 as described above, can be supplied to another device via, for instance, a digital interface circuit (not shown) or a digital input/output terminal (not shown). Conversely, a digital signal, which is supplied, for instance, from an external device via a digital interface (not shown), can be received and recorded on the hard disk in the HDD 130 to formulate and output an analog video signal and analog audio signal.

[When the TV Tuner or Radio Tuner is Used]

The operation performed to receive an incoming analog signal via the TV tuner 102B or radio tuner 102C and record the received analog signal on the hard disk 318 or output it as an analog signal will now be described. In the present embodiment, the TV tuner 102B receives and selects a terrestrial analog TV broadcast signal, decodes it to obtain an analog video signal and analog audio signal, and supplies the obtained signals to the input switching circuit 103. In like manner, the radio tuner 102C receives and selects an AM radio broadcast signal or FM radio broadcast signal, demodulates the signal, and supplies the demodulated signal to the switching circuit 103.

In accordance with a control signal from the control section 140, the input switching circuit 103 selects and outputs a target signal. More specifically, the input switching circuit 103 performs switching to output either the analog video signal and analog audio signal, which are supplied from the TV tuner 102B, or the analog audio signal, which is supplied from the radio tuner 102C. If an analog audio input terminal and analog video input terminal are furnished, the signals input from these terminals can be supplied to the input switching circuit 103 to permit switching and handle an external analog input.

The analog audio signal fed from the input switching circuit 103 is supplied to the audio processing section 104. The audio processing section 104 converts the analog audio signal to a digital signal (audio data) and supplies the resulting audio data to the audio encoder 105. The audio encoder 105 formulates an audio ES by subjecting the supplied audio data to an MPEG data compression process or other predetermined data compression process, and supplies the resulting audio ES to the multiplexing/demultiplexing circuit 110.

Meanwhile, the analog video signal fed from the switching circuit 103 is supplied to the video processing section 106. The video processing section 106 performs a YC separation process on the supplied video signal, that is, separates the supplied video signal into a luminance signal Y and color difference signal C, performs analog-to-digital conversion, chroma decoding, and other processes on the resulting signals, and converts the processed signals to digital component video data. Further, the video processing section 106 performs prefiltering and various other video signal processes, and supplies the resulting processed video data to the video encoder 107 and output video processing section 125.

In accordance with a horizontal sync signal, vertical sync signal, and field judgment signal that are obtained when the video signal supplied to the video processing section 106 is subjected to sync separation, the video processing section 106 is also capable of generating a clock signal, which provides necessary timing for each circuit block, and a sync signal, and supplying the generated signals to each circuit block.

The video encoder 107 performs a block DCT (Discrete Cosine Transform) or other encoding process on the video data fed from the video processing section 106 to generate a video ES, and supplies the generated video ES to the multiplexing/demultiplexing circuit 110.

In a recording sequence, the multiplexing/demultiplexing circuit 110 performs a multiplexing process on the audio ES fed from the audio encoder 105, the video ES fed from the video encoder 107, and various control signals. In other words, the multiplexing/demultiplexing circuit 110 performs a multiplexing process on the MPEG audio ES, MPEG video ES, and various control signals at the time of recording to generate an MPEG system TS signal or the like. The generated TS signal is recorded on the hard disk in the HDD 130.

As described above, the audio data fed from the audio processing section 104 is supplied not only to the audio encoder 105 but also to the output audio processing section 122. The video data fed from the video processing section 106 is supplied not only to the video encoder 107 but also to the output video processing section 125.

The output audio processing section 122 can formulate an output analog audio signal, for instance, by subjecting the audio data supplied to the output audio processing section 122 to digital-to-analog conversion as described earlier, and output the formulated analog audio signal. The output video processing section 125 can formulate and output an output analog video signal as described earlier.

In other words, while the analog signal supplied via the TV tuner 102B or radio tuner 102C is converted to a digital signal and recorded on the recording medium 318, the video data and audio data to be recorded can be reproduced and output.

It goes without saying that the signal obtained via the TV tuner 102B or radio tuner 102C and converted to a digital signal can be output from a digital interface (not shown).

[Reproduction from the Hard Disk 318]

The operation that the hard disk recording apparatus 100 according to the present embodiment performs to reproduce the video data and audio data, which are recorded on the hard disk in the HDD 130 as described above, will now be described. The control section 140 exercises control so as to read a target TS signal that is to be reproduced from the hard disk in the HDD 130. The read TS signal is then supplied to the multiplexing/demultiplexing circuit 110.

In a reproduction sequence, the multiplexing/demultiplexing circuit 110 performs a process for separating a video ES and audio ES from the TS signal that is read from the hard disk in the HDD 130, supplies the separated audio ES to the audio decoder 121, and supplies the separated video ES to the video decoder 124.

The process performed after the operation of the audio decoder 121 and the process performed after the operation of the video decoder 124 are the same as those for recording the signal fed from the digital tuner 102A. More specifically, an analog audio signal is derived from the audio ES supplied to the audio decoder 121 and output, and an analog video signal is derived from the video ES supplied to the video decoder 124 and output.

The video and audio corresponding to the video data and audio data that are read from the hard disk in the HDD 130 are then output, for instance, from a TV set that is connected subsequently to the analog audio output terminal 123 and analog video output terminal 126, and can be viewed.

It goes without saying that the video data and audio data, which are read from the hard disk in the HDD 130, can be output from a digital interface (not shown).

Further, content data including the video data and audio data that are read from the hard disk in the HDD 130 can be supplied to the child apparatus 200, which is connected to the cradle 300, via the child apparatus interface 133, recorded in the memory of the child apparatus 200, and reproduced and used in the child apparatus 200.

[Use of a Communication Connection Terminal and Communication Interface]

As described earlier, the hard disk drive 3 according to the present embodiment includes the communication interface 131 and communication connection terminal 132. The communication interface 131 and communication connection terminal 132 are used to connect the hard disk drive 3 to the Internet or other network via a telephone line, acquire various data through the network, and transmit various data to the network.

The various data to be transmitted/received includes various programs and text data as well as video data and audio data. The video data and audio data can be recorded on the HDD 130 via the multiplexing/demultiplexing circuit 110.

When the multiplexing/demultiplexing circuit 110, an audio signal reproduction system, which includes audio decoder 121, output audio processing section 122, and audio output terminal 123, and a video signal reproduction system, which includes the video decoder 124, output video processing section 125, and video output terminal 126, are used, the video data and audio data acquired through a communication network can be reproduced and otherwise used.

Further, the video data and audio data acquired through the communication interface 131 and communication connection terminal 132 can be output through a digital interface (not shown).

Furthermore, programs and control data for use in the hard disk drive 3 according to the present embodiment can be received through a network, recorded in the EEPROM 144 or the like, and used as needed.

For example, the functions of the hard disk recording apparatus 100 according to the present embodiment can be enhanced through a communication network. Further, EPG data can be obtained in advance to create an electronic program guide table.

In the present embodiment, the video data and audio data are subjected to MPEG compression. However, an alternative compression method may be used. Further, the video data and audio data can be processed without being compressed.

[Portable Information Terminal Configuration]

Figure 3:
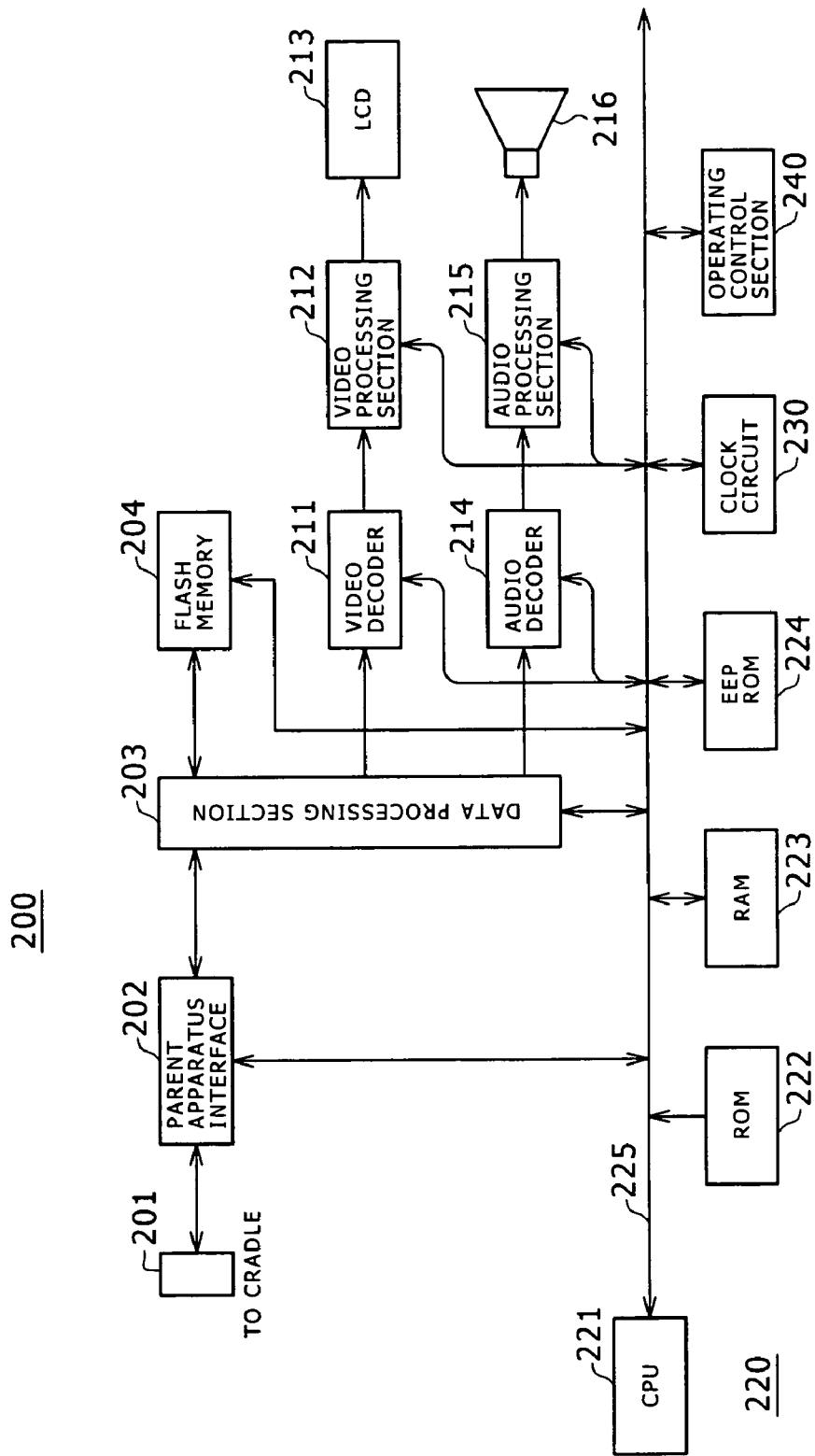
FIG. 3 is a block diagram illustrating a portable information terminal to which a reproducing apparatus according to one embodiment of the present invention is applied.

FIG. 3 is a block diagram illustrating the configuration of a portable information terminal 200 for the system according to the present embodiment. The reproducing apparatus according to an embodiment of the present invention is applied to the portable information terminal according to the present embodiment. As shown in FIG. 3, the portable information terminal 200 according to the present embodiment includes a connection end 201 for connecting to the hard disk recording apparatus 100, which is the parent apparatus, via the cradle 300 as described with reference to FIG. 1, a parent apparatus interface 202 for establishing a connection to the parent apparatus, a data processing section 203, and a flash memory 204.

The portable information terminal 200 is also provided with a video reproduction system, which includes a video decoder 211, a video processing section 212, and an LCD (Liquid Crystal Display) 213, and an audio reproduction system, which includes an audio decoder 214, an audio processing section 215, and a speaker 216. Further, the portable information terminal 200 includes a control section 220, which contains various sections of the portable information terminal 200. The control section 220 is a microcomputer to which a CPU 221, a ROM 222, a RAM 223, and an EEPROM 224 are connected via a CPU bus 225.

The ROM 222 stores the programs to be executed by the CPU 221 and the data necessary for processing. The RAM 223 is mainly used as a work area when various processes are performed. The EEPROM 224 is a so-called nonvolatile memory that stores the data to be retained even after the portable information terminal 200 is turned off. More specifically, the EEPROM 224 stores reproduction history information, various parameters, and other information as detailed later.

As shown in FIG. 3, the control section 220 is also connected to a clock circuit 230, which supplies the current date (year/month/day) and current time, and an operating control section 240, which includes various operating control keys and accepts operating control inputs from the user. The operating control section 240 can accept an operating control input from the user, convert it to an electrical signal, and supply the resulting electrical signal to the control section 220. The control section 220 can then control various sections of the portable information terminal 200 in accordance with operating control inputs from the user.

When the portable information terminal 200 is set on the cradle 300, it is connected to the hard disk recording apparatus 100, which is the parent apparatus shown in FIGS. 1 and 2, via the connection end 201. When the portable information terminal 200 is connected to the hard disk recording apparatus 100 in this manner, they can exchange information with each other.

When various data are transmitted from the hard disk recording apparatus 100, they are supplied to the parent apparatus interface 202 via the connection end 201. The data transmitted from the hard disk recording apparatus 100 is converted by the parent apparatus interface 202 to a format that can be processed in the portable information terminal 200. Further, the parent apparatus interface 202 supplies request data and various other control data to the control section 220, and supplies content data, which contains video data and audio data and is in a TS signal format, to the data processing section 203.

The control section 220 can control various sections in accordance with control data that is supplied from the hard disk controller 100 via the parent apparatus interface 202. The data processing section 203 can receive the content data that is supplied from the hard disk recording apparatus 100 via the parent apparatus interface 202, convert the content data into a format recordable in the flash memory 204 in accordance with control exercised by the control section 220, and record the converted content data in the flash memory 204.

When a user's instruction for reproducing target content data is received via the operating control section 240, the control section 220 controls the data processing section 203 to access the flash memory 204, read the content data to be reproduced, separate the read content data into video data and audio data, supply the video data to the video decoder 211, and supply the audio data to the audio decoder 214.

The video decoder 211 performs a decoding process on the video data, which is compressed by a predetermined method and supplied to the video decoder 211, obtains uncompressed video data, and supplies it to the video processing section 212. The video processing section 212 converts the received video data to an analog signal, formulates a video signal that is formatted for supply to the LCD 213, and supplies the resulting video signal to the LCD 213. The display screen of the LCD 213 can now display an image in accordance with the video data, which is contained in the content data read from the flash memory 204.

The audio decoder 214 performs a decoding process on the audio data, which is compressed by a predetermined method and supplied to the audio decoder 214, obtains uncompressed audio data, and supplies it to the audio processing section 215. The audio processing section 215 converts the received audio data to an analog signal, formulates an audio signal that is formatted for supply to the speaker 216, and supplies the resulting audio signal to the speaker 216. The speaker 216 can now emit a sound in accordance with the audio data, which is contained in the content data read from the flash memory 204.

The control section 220 of the portable information terminal 200 according to the present embodiment is capable of storing reproduction history information in the flash memory 204 or EEPROM 224. Whenever content data is reproduced in compliance with a user's instruction, the control section 220 stores the reproduction history information as mentioned above to indicate what content data was used at what time and for what period of time. Whenever content data is deleted, the control section 220 stores log data, which is a part of the reproduction history information, to indicate the content data deletion time. The time information for use in the above reproduction history information storage operation can be acquired from the clock circuit 230 by the control section 220.

As described earlier, when the portable information terminal 200 according to the present embodiment is placed on the cradle 300 to become connected to the hard disk recording apparatus 100, which serves as the parent apparatus, the reproduction history information can be transmitted to the hard disk recording apparatus 100, which serves as the parent apparatus, via the parent apparatus interface 202 and connection end 201.

As described earlier, the hard disk recording apparatus 100, which serves as the parent apparatus, receives the reproduction history information from the portable information terminal 200, which serves as the child apparatus, and analyzes the received reproduction history information. The hard disk recording apparatus 100 can then update a preference database, which is a collection of tuning instruction information, and automatically record broadcast content that the user of the portable information terminal 200 likes. Further, the hard disk recording apparatus 100 can formulate a style database, for instance, by predicting the use style of the user's portable information terminal and content data, extract the content data to be automatically transmitted to the portable information terminal 200, and supply the extracted content data to the portable information terminal 200.

[Hard Disk Recording Apparatus Information and Portable Information Terminal Information]

As described earlier, the content use system according to the present embodiment stores a large amount of content data such as TV and radio broadcast programs in the hard disk recording apparatus, which serves as the parent apparatus. The target content data for the user is transferred from the hard disk recording apparatus to the portable information terminal 200 so that various content data is used through the portable information terminal 200.

In other words, the content use system according to the present embodiment is constructed for the purpose of establishing an environment where target content data can be used anytime, anywhere through the portable information terminal, which serves as the child apparatus, without directly using the hard disk recording apparatus 100, which stores a large amount of content data, and without causing the user to perform a complicated procedure.

In order to establish the above-mentioned content use environment without requiring the user to perform a complicated procedure, the hard disk recording apparatus 100, which serves as the parent apparatus, can automatically receive and select content data such as TV and radio broadcast programs in accordance with the user's preference. Further, the hard disk recording apparatus 100, which serves as the parent apparatus, analyzes and determines the use style of the portable information terminal, which serves as the child apparatus. Therefore, the hard disk recording apparatus 100 can extract from the hard disk the content data that is likely to be used through the portable information terminal 200, transfer the extracted content data to the portable information terminal 200, and automatically store the content data in the flash memory 204 of the portable information terminal 200 without requiring the user to issue any instruction.

To implement the above function, the hard disk in the hard disk recording apparatus 100 and the memory in the portable information terminal 200 store various databases and history information.

Figure 4:
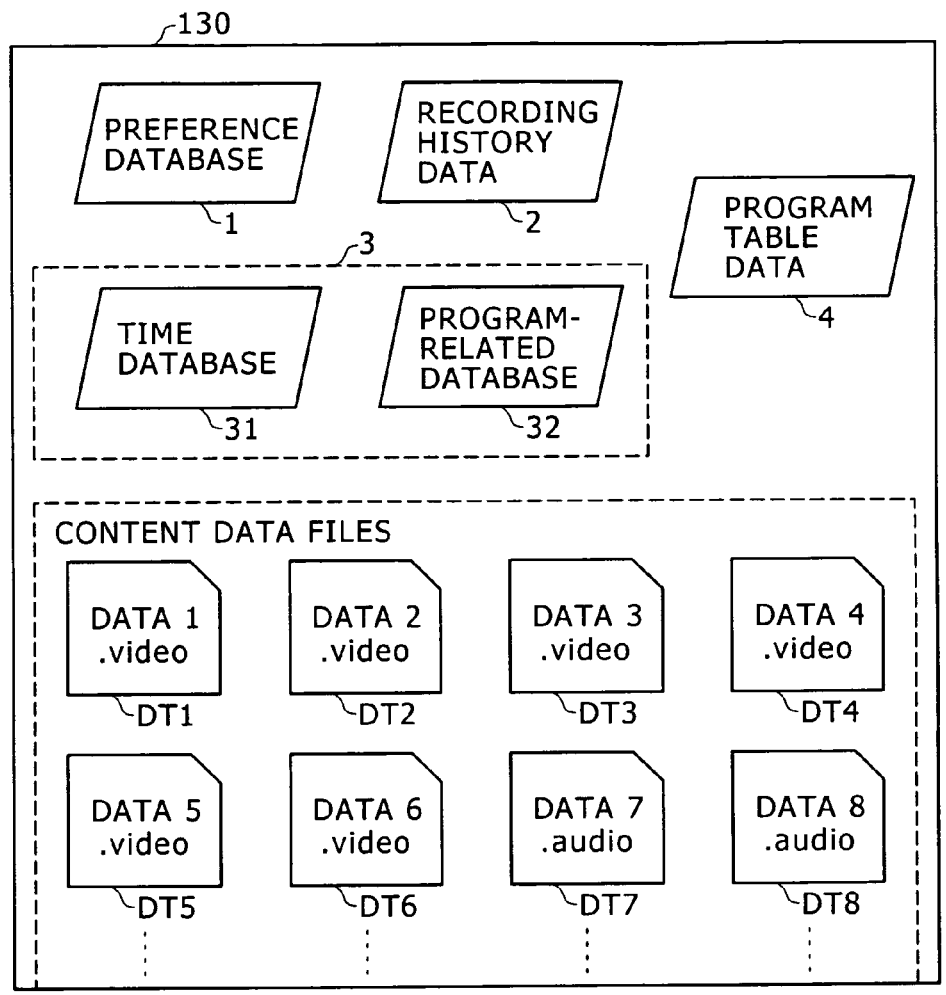
FIG. 4 illustrates information that is managed by the hard disk recording apparatus.
Figure 5:
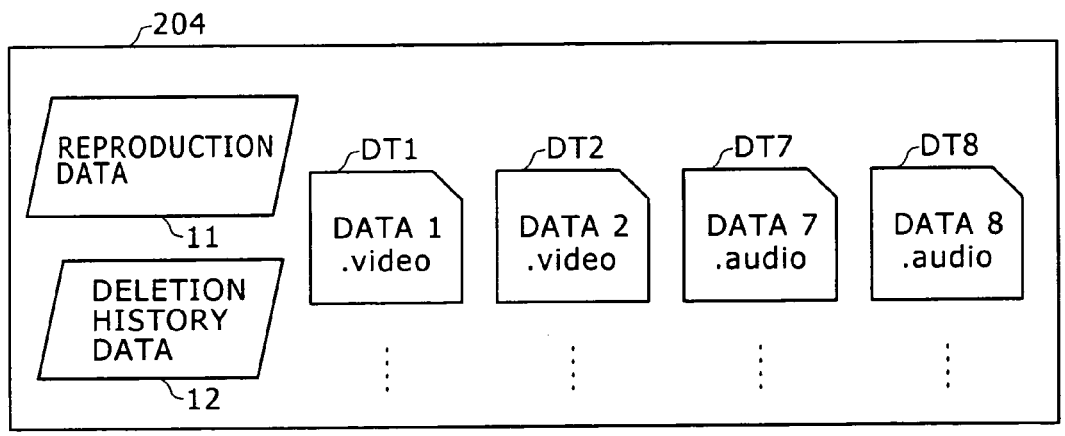
FIG. 5 illustrates information that is managed by the portable information terminal.

FIG. 4 illustrates databases that are formulated on the hard disk of the HDD 130 in the hard disk recording apparatus 100, which serves as the parent apparatus, and content data that is stored on the hard disk. FIG. 5 illustrates data that is stored in the memory of the portable information terminal 200, which serves as the child apparatus.

Formulated on the HDD 130 in the hard disk recording apparatus 100, which serves as the parent apparatus, are a preference database 1, recording history data 2, a style database 3, and program table data 4 as shown in FIG. 4. The style database 3 includes a time database 31 and a program-related database 32 as shown in FIG. 4.

In addition, content data such as TV and radio broadcast programs are recorded as files, which are designated as data 1, data 2, data 3, and so on as indicated in FIG. 4. In FIG. 4, a file named "data 1.video" represents content data named "data 1," which contains TV broadcast program data or other video data; and a file named "data 7.audio" represents content data named "data 7," which contains radio broadcast program data or other audio data only. These content data are supplied to the portable information terminal 200, which serves as the child apparatus.

The preference database 1 stores tuning instruction information. More specifically, the information stored in the preference database 1 indicates the user's preference about content as detailed later. The recording history data 2 is a record of detailed information about content data recordings on the HDD 130. It serves as a list of content data that are stored on the HDD 130. The style database 3 stores information (use style indicating information) that is used, for instance, to grasp and manage the use style of the portable information terminal 200.

The program table data 4 is created in accordance with EPG data that is superposed over a digital TV broadcast signal and supplied, broadcast program table data that is superposed over an analog TV broadcast signal and supplied, broadcast program table data that is superposed over a radio broadcast signal and supplied, or broadcast program table data that is acquired through the Internet. The program table data 4 not only shows several weeks of a broadcast schedule (broadcast dates and times) of various broadcast programs, but also includes information that indicates the genre, name, cast, and brief description of each broadcast program.

Meanwhile, the flash memory 204 of the portable information terminal 200 according to the present embodiment, which serves as the child apparatus, records reproduction data 11, deletion history data 12, and TV and radio broadcast programs and other content data supplied from the hard disk recording apparatus 100, which serves as the parent apparatus. The content data are recorded as files, which are designated as data 1, data 2, data 3, and so on.

The reproduction data 11 is the information indicating the reproduction of content data at the portable information terminal 200 as described later. When unnecessary content data is deleted, the deletion history data 12 is used to record the name of a deleted content data file and the time of deletion.

In FIG. 5, as is the case with FIG. 4, a file named "data 1.video" represents content data named "data 1," which contains TV broadcast program data or other video data; and a file named "data 7.audio" represents content data named "data 7," which contains radio broadcast program data or other audio data only.

The meanings and functions of the databases and recording history data, which are recorded on the HDD 130 of the hard disk recording apparatus 100 as indicated in FIG. 4, and the meanings and functions of the reproduction data, which is recorded in the flash memory 204 of the portable information terminal 200 as indicated in FIG. 5, will be described below.

[Preference Database 1]

First of all, the preference database 1, which is formulated on the HDD 130 in the hard disk recording apparatus 100, will be described. FIG. 6 illustrates the preference database 1. The preference database 1 stores information that indicates the user's preference about content data. As indicated in FIG. 6, it stores the information indicating, for instance, the genre, program name, cast, keyword 1, and keyword 2.

The genre represents the genre of content. It indicates a user's favorite type of content such as drama, sports, news, variety, animation, or movie. The program name indicates the program name of broadcast content. It indicates the name of a user's favorite program such as a serial that the user views regularly. The cast indicates the cast of a broadcast program. It indicates the user's favorite cast. Keywords 1 and 2 are descriptive information that indicates the user's preference and taste such as "Chinese noodles" or "ceramics."

If no information is registered in the preference database 1, the user can register his/her preference by entering, for instance, the genre, program name, cast, keyword 1, and keyword 2 from the operating control section 170 of the hard disk recording apparatus 100. Further, the genre, program name, cast, keywords, and other items of preference information can be extracted from the EPG, program table information, teletext, and other information about a broadcast program that the user selected by operating the hard disk recording apparatus 100. The information extracted in the above manner can be registered in the preference database 1.

As described later, the preference database 1 can be updated in accordance with the content reproduction data 11, which is supplied from the portable information terminal 200.

The program table data 4 containing the electronic program table explained with reference to FIG. 4 is referenced in accordance with the information registered in the preference database 1. Broadcast programs matching the user's preference can then be automatically received, selected, and recorded on the HDD 130. Therefore, if the preference database 1 shown in FIG. 6 exists, a broadcast program whose genre is "Drama," whose program name is "YYYY," and whose cast is "XXX - - -," a broadcast program whose genre is "Sports" and whose keyword is "BASEBALL" or "baseball," a broadcast program whose genre is "News" and whose program name is "News XXX," and a broadcast program whose genre is "News" and whose program name is "News YY" can be automatically recorded on the HDD 130 without awaiting instructions from the user.

As such being the case, even if the genre indicated by the program table data 4 is "Sports" in a situation where the information contained in the program table data 4 is searched in accordance with the information contained in the preference database 1, sports broadcast programs other than a baseball program, such as a soccer or golf broadcast program, will not be recorded because the keyword registered in the preference database 1 is "Baseball."

Further, even if the genre indicated by the program table data 4 is "News," a news program having a program name other than registered in the preference database 1 will not be recorded. Even if the genre and program name indicated by the program table data 4 are complied with, programs whose cast differs from the cast registered in the preference database 1 will not be recorded.

As described above, the program table data 4 is referenced in accordance with the information registered in the preference database 1. Therefore, only the user's favorite broadcast programs can be recorded automatically and efficiently.

[Recording History Data 2]

When a broadcast program that is probably liked by the user is recorded in accordance with the preference database 1 and program table data 4, the information about such a program is additionally recorded as the recording history data 2 as indicated in FIG. 7. As shown in FIG. 7, the file name, recording date/time, broadcast channel, genre, program name, cast, keyword, and other information about a broadcast program that is recorded on the HDD 130 are additionally recorded.

The file name is automatically generated by the control section 140 when broadcast program data is recorded on the HDD 130. The control section 140 acquires the recording date/time from the clock circuit 160 at the beginning of recording. The information indicating the broadcast channel can be derived from the tuning instruction information that was used when the control section 140 controlled the tuner section 102. The other items of information such as the genre, program name, cast, and keyword can be mainly derived from the program table data 4.

The record contained in the recording history data 2 shown in FIG. 7 indicates that a broadcast program that was broadcast between 22:00 and 22:55, Oct. 19, 2004 was recorded as the file named "data 1.video." The record also indicates that the data contained in the file "data 1.video" is a broadcast program whose broadcast channel was "8," whose genre was "News," whose program name was "News XXX," and whose cast was "ZZ - - - ."

As is obvious from the above, the recording history data 2 makes it possible to accurately determine what content data are stored on the HDD 130. As described later, the recording history data 2 can be used when, for instance, the content data to be supplied to the portable information terminal 200 is to be extracted.

As described above, when a broadcast program is recorded, the history data about the recorded broadcast program is generated and additionally recorded as the recording history data, which is shown in FIG. 7. Therefore, when the information contained in the recording history data 2 is referenced, it is possible to determine accurately and promptly what content data are stored on the HDD 130.

[Time Database 31]

The time database 31, which constitutes the style database 3, will now be described. FIG. 8 illustrates the time database 31. The time database 31 is provided so that the hard disk recording apparatus 100, which serves as the parent apparatus, determines the use style of the portable information terminal 200, which serves as the child apparatus. In other words, the time database 31 is used when the hard disk recording apparatus 100 determines how the portable information terminal 200 is used.

The time database 31 is divided into the information about each day of a week so that the periodicity of the use style of the portable information terminal 200 can easily be grasped. The time database 31 contains information about the child apparatus take-out time, the child apparatus use time (total use time (TTL)), the use time classified according to the genre of content used, and the content use time slots.

The child apparatus take-out time is the time at which the hard disk recording apparatus 100, which serves as the parent apparatus, detected that the portable information terminal was removed from the cradle 300. The portable information terminal 200 according to the present embodiment is placed on the cradle 300 to receive the up-to-date content data from the hard disk recording apparatus 100, which serves as the parent apparatus, when, for instance, the user comes home at night. After the up-to-date content data is received, the portable information terminal 200 is removed from the cradle 300 and carried by the user when, for instance, the user leaves home in the next morning.

Therefore, the hard disk recording apparatus 100 recognizes the time at which the portable information terminal 200 is removed from the cradle 300 as the child apparatus take-out time. More specifically, the electrical state of the connection point between the cradle 300 and portable information terminal 200 is monitored for a change in the electrical characteristic. In this manner, the time at which the portable information terminal 200 is removed from the cradle 300 can be detected. The information about the time is acquired from the clock circuit 160 to determine the portable information terminal take-out time.

The information about the use time (TTL) and subsequent items, including the reproduction time and use time slots of each genre of content data used, can be formulated in accordance with the reproduction data about the portable information terminal 200, which will be described later.

The information contained in the time database 31 shown in FIG. 8 indicates that the user of the portable information terminal 200 removes the portable information terminal 200 from the cradle 300 at about 7:30 in the morning Monday through Friday and at about 10:00 in the morning Saturday and Sunday.

The information contained in the time database 31 also indicates that the user uses content whose genre is "News" 15 minutes a day Monday through Friday. Further, the information indicates that the user uses content whose genre is "Music" more than 45 minutes each day except Thursday and Sunday. Furthermore, the information indicates that the user uses content whose genre is "Drama" or "Variety" about 40 minutes each day except Wednesday and Saturday. Moreover, the use time slots of each piece of content are indicated by the information furnished by use time slots 1 and 2.

As described above, the information contained in the time database 31 indicates how long the portable information terminal 200 is used each day, what genre the content data falls under, how long the content data is used, and what time slot the content data is used in.

[Program-related Database 32]

In the hard disk recording apparatus 100, the program-related database 32 is formulated as another database that constitutes the style database. FIG. 9 illustrates the program-related database 32. As shown in FIG. 9, the program-related database 32 has freshness information (freshness parameter) and storage information (storage parameter) for each content data genre.

The freshness information about content data relates to an interval between the instant at which content data is recorded on the HDD 130 in the hard disk recording apparatus 100 and the instant at which the recorded content data is transferred to the child apparatus. The freshness information about each content data genre is obtained by digitizing the above-mentioned interval.

The time at which each piece of content data was recorded on the HDD 130 is obtained from the clock circuit 160 and retained. Further, the time at which each piece of content data was transferred to the portable information terminal 200 is obtained from the clock circuit 160 and retained. The interval (time) between the instant at which each piece of content data was recorded on the HDD 130 and the instant at which each piece of content data was transferred to the portable information terminal 200 is then determined. The content data freshness information is obtained by adding all the interval values for each genre and dividing the resulting value by the number of pieces of content data. The calculations are performed on the assumption that the value "1" is equivalent to one day (24 hours).

The storage information about content data relates to an interval between the instant at which content data is transferred to the portable information terminal 200, which serves as the child apparatus, and the instant at which the content data is deleted. The storage information about each content data genre is obtained by digitizing the above-mentioned interval.

The time at which each piece of content data was transferred from the hard disk recording apparatus 100 to the portable information terminal 200 is obtained from the clock circuit 160 and retained. Further, the time at which each piece of content data was deleted from the portable information terminal 200 is received. The interval (time) between the instant at which each piece of content data was transferred from the HDD 130 and the instant at which each piece of content data was deleted from the portable information terminal 200 is then determined. The content data storage information is obtained by adding all the interval values for each genre and dividing the resulting value by the number of pieces of content data. The calculations are performed on the assumption that the value "1" is equivalent to one day (24 hours).

The deletion time concerning the content data transferred to the portable information terminal 200 can be obtained at the portable information terminal 200. The content data transferred to the portable information terminal 200 is reproduced and used. However, when the content data is no longer needed, the user of the portable information terminal 200 performs a process for deleting the content data in order to provide a storage area for new content data.

When content data is deleted from the flash memory 204 in the portable information terminal 200, the file name or other identification information about the deleted content data and the current time that the control section 220 of the portable information terminal acquires from the clock circuit 230 at the time of deletion are retained as the deletion history data 12 as indicated in FIG. 5. The retained deletion history data 12 is supplied to the hard disk recording apparatus 100. The control section 140 of the hard disk recording apparatus 100 is then able to know the deletion time at which the content data transferred to the portable information terminal 200 was deleted.

The control section 140 of the hard disk recording apparatus 100 is then able to know the period during which each piece of content data was stored in the portable information terminal 200 in accordance with the time at which each piece of content data owned by the hard disk recording apparatus 100 was supplied to the portable information terminal 200 and the time at which each piece of content data was deleted from the portable information terminal 200. The content data storage information is obtained by adding all the storage period values for each genre and dividing the resulting value by the number of pieces of content data.

As described earlier, the transfer time for the portable information terminal 200, which is managed for each piece of content data at the hard disk recording apparatus 100, may be used. Further, when the control section 220 of the portable information terminal 200 receives content data from the hard disk recording apparatus 100, the time of content data reception may be acquired from the clock circuit 230 and stored in the memory of the portable information terminal 200 on an individual content data basis. The information managed by the portable information terminal 200 in the above manner may be received and used.

In the above case, the control section 220 of the portable information terminal 200 may calculate the storage period of each piece of content data and supply the calculated storage period to the hard disk recording apparatus 100, which serves as the parent apparatus.

As is obvious from the program-related database shown in FIG. 9, content data whose genre is "News" is used promptly and deleted shortly. Content data whose genre is "Sports" is used with relative promptness and stored for a short period of time.

As regards content data whose genre is "Variety" or "Music," the interval between the instant at which the content data is acquired by the hard disk recording apparatus 100 and the instant at which the content data is transferred to the child apparatus is relatively long (several days). Further, the period of storage at the portable information terminal 200 is relatively long.

"News" or "Sports" content data, for which immediacy is essential, needs to be transferred from the hard disk recording apparatus 100 to the portable information terminal 200 without undue delay. However, "Variety" or "Music" content data need not be transferred immediately, and should be replaced with new content data at intervals of 3 days or longer while considering the free space of the flash memory 204.

In accordance with the time database and program-related database 32, the present embodiment provides, with optimum timing for the user of the portable information terminal 200, an environment in which content data desired by the user is predicted, extracted, and transferred to the portable information terminal 200 for use.

[Reproduction Data 11]

The reproduction data 11, which is, as described with reference to FIG. 5, formulated by the portable information terminal 200, which serves as the child apparatus, and supplied to the hard disk recording apparatus 100, which serves as the parent apparatus, will now be described. FIG. 10 illustrates the reproduction data that is formulated in the portable information terminal 200. In the example shown in FIG. 10, the reproduction data includes a date (date of reproduction), total reproduction time, the file name of reproduced content data (reproduction file name), the reproduction time of reproduced content data, and reproduction time slot.

When target content data is reproduced at the portable information terminal 200 in compliance with a reproduction instruction issued from the operating control section 240, the file name of the content data is identified, and the time interval between the start and end of content data reproduction is acquired from the clock circuit 230. Consequently, the reproduction time and reproduction time slot of the content data are determined. The determined reproduction time is added to the total reproduction time.

In the manner described above, the reproduction data, which describes the use of reproduced content data, is formulated in the portable information terminal 200. The reproduction data 11 and the deletion history data 12, which indicates the time of content data deletion, are transferred to the hard disk recording apparatus 100, which serves as the parent apparatus, in order to update the preference database 1, which is formulated in the hard disk recording apparatus 100, which serves as the parent apparatus, and update the time database 31 and program-related database 32, which constitute the style database 3.

In other words, in the content use system according to the present embodiment, the reproduction history information that is transferred from the portable information terminal 200, which serves as the child apparatus, to the hard disk recording apparatus 100, which serves as the parent apparatus, includes the reproduction data 11 and deletion history data 12.

As described earlier, the hard disk recording apparatus 100, which serves as the parent apparatus, can automatically receive and select a user's favorite program and record it on the HDD 130 in accordance with the preference database 1 and the program table data 4, which is based, for instance, on a previously obtained EPG. Further, in accordance with the time database 31 and program-related database 32 within the style database 3, the hard disk recording apparatus 100 can automatically extract content data that the user is likely to use at the portable information terminal 200, transfer the extracted content data to the portable information terminal 200, and store the transferred content data in the flash memory 204 of the portable information terminal 200.

[Hard Disk Recording Apparatus and Portable Information Terminal Operations]

The operations performed by the hard disk recording apparatus 100 and portable information terminal 200 according to the present embodiment will now be described with reference to flowcharts in FIGS. 11 and 12. As described with reference to FIG. 1, the hard disk recording apparatus 100 and portable information terminal 200 operate independently of each other. As described in detail later, when the portable information terminal 200 is properly set on the cradle 300, which is connected to the hard disk recording apparatus 100, the portable information terminal 200 is connected to the hard disk recording apparatus 100 so that the hard disk recording apparatus 100 and portable information terminal 200 can exchange various data with each other.

Figure 11:
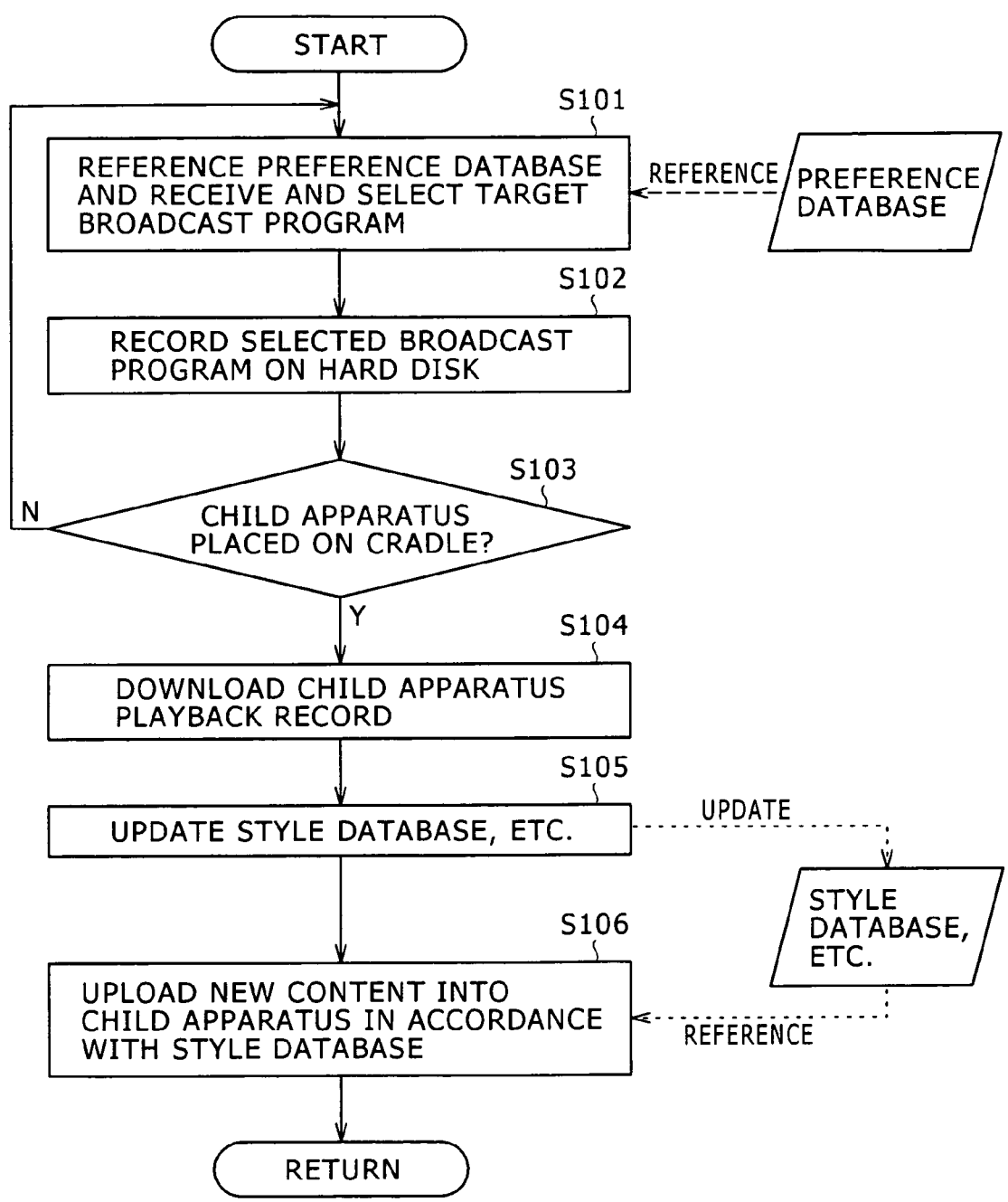
FIG. 11 is a flowchart illustrating an operation that is performed by the hard disk recording apparatus.
Figure 12:
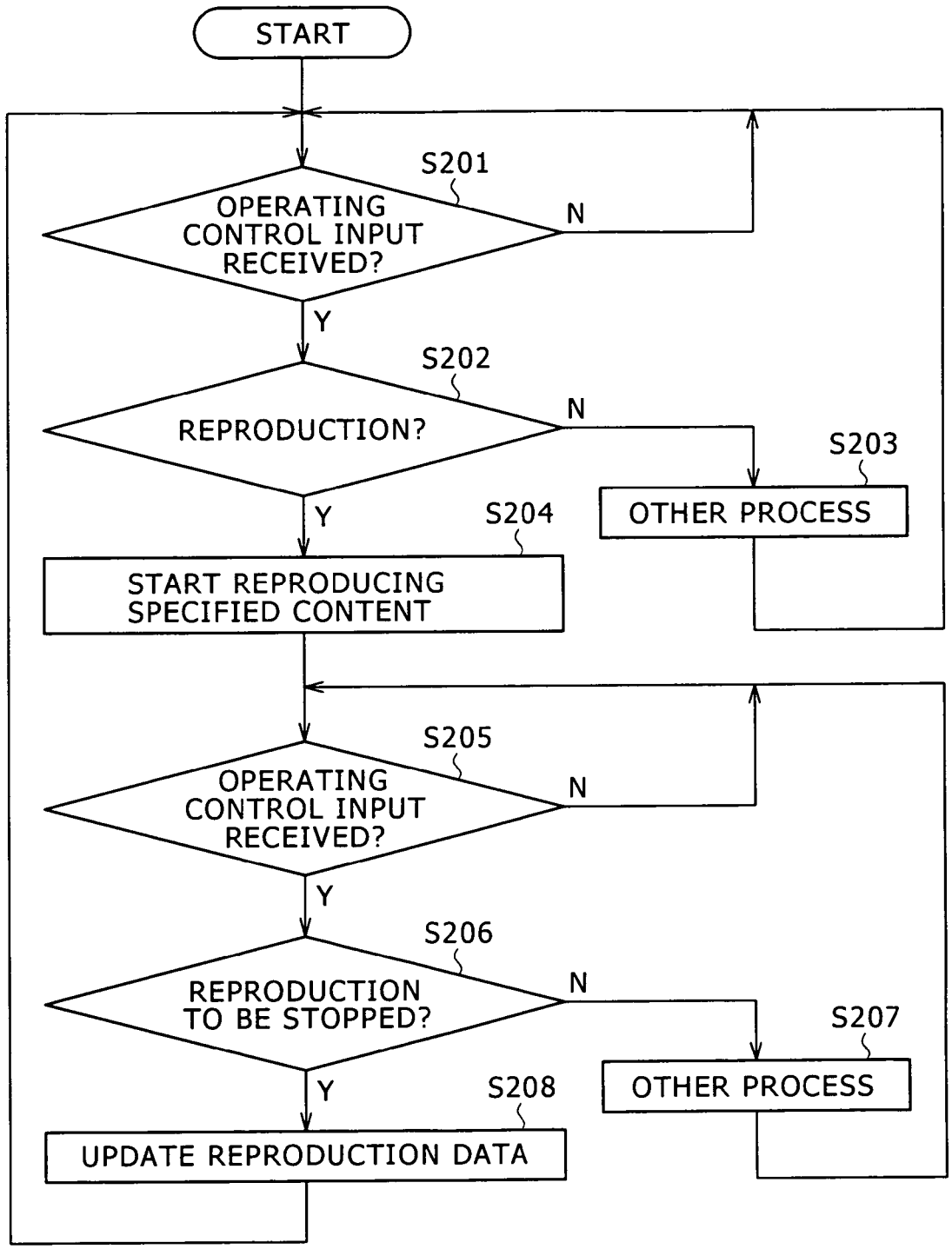
FIG. 12 is a flowchart illustrating an operation that is performed by the portable information terminal.

In the hard disk recording apparatus 100, the process indicated in the flowchart in FIG. 11 is usually performed. In accordance with the preference database, the control section 140 of the hard disk recording apparatus 100 performs step S101 to reference the program table data 4, which is based, for instance, on an EPG, and automatically receive and select a target broadcast program, which the user probably likes. Next, the control section 140 of the hard disk recording apparatus 100 performs step S102 to record (store) a broadcast signal for formulating the selected broadcast program on the HDD 130.

More specifically, in step S101, the control section 140 of the hard disk recording apparatus 100 references the program table data 4 in accordance with the data contained in the preference database 1. If the program table data contains the information about a broadcast program that matches the genre, program name, cast, and keywords registered in the preference database 1, the control section 140 of the hard disk recording apparatus 100 detects the arrival of the broadcast time for the broadcast program in accordance with the current time supplied from the clock circuit 160, automatically receives and selects the broadcast program, and performs step S102 to record the broadcast program that was received and selected in step S101.

Next, the control section 140 performs step S103 to judge whether the portable information terminal 200, which serves as the child apparatus, is placed on (connected to) the cradle 300. In step S103, the control section 140 monitors the electrical state of the connection end of the cradle 300 to judge whether the portable information terminal 200 is placed on the cradle 300.

If the judgment result obtained in step S103 indicates that the portable information terminal 200 is not placed on the cradle 300, steps S101 and beyond are repeated. If the judgment result obtained in step S103 indicates that the portable information terminal 200 is placed on the cradle 300, the control section 140 requests the portable information terminal 200 via the child apparatus interface 133 to supply the reproduction data 11 and deletion history data 12, and downloads the reproduction data 11 and deletion history data 12 from the child apparatus (step S104).

In step S105, the control section 140 of the hard disk recording apparatus 100 updates the time database 31, which is described with reference to FIG. 8, in accordance with the reproduction data 11, which is downloaded from the portable information terminal 200 and described with reference to FIG. 10, and updates the program-related database 32, which is described with reference to FIG. 9, in accordance with the time at which each piece of locally owned content data was transferred to the portable information terminal 200 and the deletion history data, which indicates the time of deletion from the portable information terminal 200.

When the database update process is performed in step S105, the information contained in the preference database 1 is also updated in accordance with the reproduction data 11 supplied from the portable information terminal 200. For example, the recording history data in the hard disk recording apparatus is referenced in accordance with reproduced content data (file name), and a process is performed, for instance, to add data that is not registered in the preference database 1, such as the genre, program name, cast, and keywords of content data used. The genre, program name, cast, and keywords of content data acquired and used as mentioned above may be added only when they arise a predetermined number of times or more (e.g., three times or more).

In accordance with the time database 31 and program-related database 32, the control section 140 of the hard disk recording apparatus 100 performs step S106 to extract from the hard disk in the HDD 130 the content data that the user is likely to use through the portable information terminal 200 and should be transferred to the portable information terminal 200 and transfer the extracted content data to the portable information terminal 200 via the child apparatus interface 133, connection end 134, and cradle 300. The portable information terminal 200 receives the content data via the connection end 201 and parent apparatus interface 202, and records (stores) the content data in the flash memory 204 via the data processing section 203 for use.

In step S106, the control section 140 of the hard disk recording apparatus 100 predicts the child apparatus take-out time in accordance with the information contained in the time database 31 and program-related database 32, and performs a process, for instance, to extract content data that should be transferred before the child apparatus take-out time, has a small freshness value, and is used steadily or frequently.

The reproduction time slot information indicates what time the content data will be used. As regards the use style, news programs are used during a commuting time slot. However, the use of image-containing content data is not always suitable for the commuting time slot. Therefore, it is made possible to extract and transfer a radio broadcast news program, which includes audio only.

The processing steps indicated in the flowchart in FIG. 11 are mainly performed by the hard disk recording apparatus 100. However, when the hard disk recording apparatus 100 performs step S106 to transfer content data to the portable information terminal 200 as described earlier, the transferred content data is stored in the flash memory 204 of the portable information terminal 200.

The operation performed by the portable information terminal 200 will now be described. FIG. 12 is a flowchart illustrating the operation of the portable information terminal 200. The portable information terminal 200 is to be removed from the cradle 300 and carried for use. After the portable information terminal 200 is turned on, it performs a process as indicated in FIG. 12.

In step S201, the control section 220 of the portable information terminal 200 is ready to receive an operating control input from the user via the operating control section 240. When it is judged that an operating control input is received, step S202 is performed to judge whether the received operating control input carries a reproduction instruction. If the judgment result obtained in step S202 indicates that the received operating control input does not carry a reproduction instruction, step S203 is followed to perform a specified process such as a sound volume/quality adjustment process or image quality adjustment process. After completion of step S203, steps S201 and beyond are repeated.

If, on the other hand, the judgment result obtained in step S202 indicates that the received operating control input carries a reproduction instruction, the control section 220 controls the data processing section 203 and video and audio systems, reads the content data designated by the reproduction instruction from the flash memory 204, and begins to reproduce the read content data (step S204). In step S204, the reproduction stat time for the content data is acquired from the clock circuit 230 and retained.

The control section 220 of the portable information terminal 200 then becomes ready to receive an operating control input from the user (step S205). When it is judged that an operating control input is received, step S206 is performed to judge whether the received operating control input carries a reproduction stop instruction. If the judgment result obtained in step S206 indicates that the received operating control input does not carry a reproduction stop instruction, step S207 is followed to perform a specified process such as a sound volume/quality adjustment process or image quality adjustment process. After completion of step S207, steps S205 and beyond are repeated.

If, on the other hand, the judgment result obtained in step S206 indicates that the received operating control input carries a reproduction stop instruction, the control section 220 acquires the reproduction stop time from the clock circuit, determines the reproduction time and reproduction time slot from the reproduction start time acquired in step S204, updates the reproduction data described with reference to FIG. 10 (step S208). After completion of step S208, steps S201 and beyond are repeated.

The reproduction data is formulated in the portable information terminal 200 as described above. If any previously used content data is deleted, the deletion history data is formulated as described earlier. The deletion history data includes the file name and deletion time of the deleted content data. The deletion history data formulated in this manner is supplied to the hard disk recording apparatus 100, which serves as the parent apparatus, and used to update each database as described earlier.

The reproduction data may alternatively include the content data deletion history data. However, the reproduction data and deletion history data differ in properties and entail different management methods. In the present embodiment, therefore, these two data are separately managed.

In the content use system according to the present embodiment, the hard disk recording apparatus 100, which serves as the parent apparatus, can automatically receive and select a user's presumably favorite broadcast program (content) in accordance with the preference database 1 and program table data 4, and store such a broadcast program on the HDD 130 as described above. Further, the hard disk recording apparatus 100 can automatically extract content data that the user is likely to use from the HDD 130 in accordance with the time database 31 and program-related database 32, which constitute the style database 3, and the user's use style (use) of the portable information terminal, and automatically transfer the extracted content data to the portable information terminal 200 for use at the portable information terminal 200.

Further, the preference database 1 of the hard disk recording apparatus 100 and the time database 31 and program-related database 32, which constitute the style database 3 of the hard disk recording apparatus 100, can be updated as needed in accordance with the reproduction data and deletion history data, which are supplied from the portable information terminal 200, in order to constantly reflect the use of the portable information terminal 200 and content data.

Alternatively, however, only the preference database 1 may be updated while allowing the user to specify the content data that is to be transferred for use at the portable information terminal 200. Another alternative is to update only the time database 31 and program-related database 32, which constitute the style database 3, while setting up the preference database 1 in accordance with a user's operating control input.

The style database 3 indicates what content data the child apparatus carries and how such content data is viewed or otherwise used. If, for instance, the user's preference includes "Drama" and specific cast and such a drama broadcast is recorded by the parent apparatus in a situation where the user uses the child apparatus on a commuter train and cannot or does not want to view video, the parent apparatus can refrain from transferring such a drama broadcast to the child apparatus.

When a target broadcast program is to be received, selected, and stored on the HDD 130, the hard disk recording apparatus 100 analyzes content data, compresses the content data if necessary, and stores the content data. If, for instance, FM audio is recorded, it can be separated and stored in a number of files depending on whether music or speech is recorded. If, for instance, a TV broadcast is recorded, it can be separated and stored in a number of files depending on whether it is a commercial message or broadcast program. In this manner, it is possible to transfer only the musical content data to the portable information terminal 200 or transfer a program without commercial messages to the portable information terminal 200.

The hard disk recording apparatus 100, which serves as the parent apparatus, operates as indicated in the flowchart in FIG. 11. In reality, however, the operation performed by the hard disk recording apparatus 100 is divided into three major tasks as shown in FIG. 13 so that the hard disk recording apparatus 100 operates properly no matter when the portable information terminal 200 is placed on the cradle 300.

Task 1 is executed at the beginning of recording. It stores acquired data in the RAM. This task acquires a broadcast program that is received and selected via an antenna (step S301), converts the acquired broadcast program into digital data, and sequentially stores the digital data in a temporary storage RAM area for data storage purposes (step S302).

Task 2 is executed simultaneously with task 1 to analyze the data stored in the RAM (step S401), define each piece of data (step S402), divide the data in accordance with definitions, and store the divided data on the HDD 130 (step S403). For analysis purposes, as described earlier, TV broadcast program commercial messages are cut, or the broadcasting sound mode (bilingual/stereo/monaural) is automatically determined to detect and cut commercial messages.

Task 3 is executed when, for instance, the data in the parent apparatus is updated or the child apparatus is connected to the parent apparatus. If the reproduction data in the child apparatus is updated, it is supplied from the child apparatus to the parent apparatus (step S501) to update the preference database and style database in the parent apparatus (step S502). In accordance with the up-to-date style database, the data that the user presumably wants to view or listen to at the child apparatus is selected from the data in the parent apparatus and transferred (step S503).

Since the tasks perform their own processes independently, the hard disk recording apparatus 100, which serves as the parent apparatus, can deal with the portable information terminal 200 no matter when it is connected to the hard disk recording apparatus 100 via the cradle 300.

In the content use system according to the present embodiment, the parent apparatus updates the information about the child apparatus in accordance with the user's style as described above while the child apparatus is connected to the parent apparatus. As far as the user places the child apparatus on the cradle and carries the child apparatus when the user leaves home, the user can view or listen to the user's favorite, fresh content anytime, anywhere.

The information about reproduction at the child apparatus is stored in the child apparatus memory as the reproduction data and fed back into the preference and style databases. This ensures that content matching the user's viewing/listening style is automatically transferred to the child apparatus.

Content data are automatically transferred from the hard disk recording apparatus 100 to the portable information terminal 200 in accordance with the style database 3. Alternatively, however, the user can manually select the content to be transferred to the child apparatus and transfer the selected content to the child apparatus. Further, before the portable information terminal 200, which serves as the child apparatus, is returned to the cradle, the user can note the content data stored in the portable information terminal 200 and specify the content data to be retained and the content data to be deleted.

As regards the use of the program-related database 32, when a news program is transferred to the portable information terminal 200 and deleted within the same day, the associated freshness information and storage information in the program-related database are both set to the value 0. When content data is to be transferred from the parent apparatus to the child apparatus, the content data whose freshness and storage period do not greatly differ from the above-mentioned values takes precedence. The reason is that the information will be used with certainty when the freshness information value is small while the storage period is short.

If the flash memory 204 of the portable information terminal 200 has limited free space in a situation where content data is to be transferred from the hard disk recording apparatus 100 to the portable information terminal 200, the data recorded in the flash memory 204 can be automatically reduced in accordance with the information contained in the program-related database 32. More specifically, the period of content data storage in the portable information terminal 200 can be compared against the storage information about each genre in the program-related database 32, which is formulated in the hard disk recording apparatus 100. When content data is to be deleted, the content data whose actual storage period does not greatly differ from the storage information may take precedence.

For example, when the content data stored on the HDD 130 in the hard disk recording apparatus 100 is to be reduced, the content data that was recorded more than a week ago can be automatically deleted in accordance with a recording date that is stored as the recording history data 2, which is shown in FIG. 7.

In the present embodiment, which has been described above, the hard disk recording apparatus is used as the parent apparatus. However, the present invention is not limited to the use of such a parent apparatus. For example, a recording apparatus or recording/reproducing apparatus that uses a Blu-ray Disc or other large-capacity optical disk may also be used as the parent apparatus. In other words, the recording medium to be used is not limited to a hard disk. The present invention can be applied to a recording apparatus or recording/reproducing apparatus that uses an optical disk, magnetooptical disk, magnetic disk, semiconductor memory, or other recording medium.

In the present embodiment, which has been described earlier, the portable information terminal, which serves as the child apparatus, uses a flash memory as a recording medium. However, the present invention is not limited to the use of such a child apparatus. For example, a portable information terminal that uses a Blu-ray Disc or other optical disk, magnetooptical disk, magnetic disk, or other recording medium may also be used as the child apparatus.

The present invention can also be applied to a configuration in which the portable information terminal, which serves as the child apparatus, does not have a memory for content data storage but reproduces in real time the content data supplied from the hard disk recording apparatus or other parent apparatus.

In other words, each time the portable information terminal, which serves as the child apparatus, uses the content data supplied from the hard disk recording apparatus, which serves as the parent apparatus, use description data is generated. When the use description data is fed to the parent apparatus, the parent apparatus can extract the content data to be supplied to the child apparatus in accordance with the use description data, and automatically transfer the extracted content data to the child apparatus as is the case with the present embodiment, which has been described above.

As a result, the portable information terminal, which serves as the child apparatus, can automatically receive content data in accordance with the use style of the portable information terminal without requesting the parent apparatus to supply specific content data. In this instance, the hard disk recording apparatus, which serves as the parent apparatus, can control the time of content data supply from the hard disk recording apparatus, which serves as the parent apparatus, to the portable information terminal, which serves as the child apparatus, in accordance with the reproduction data or other information supplied from the child apparatus.

A system configuration in which the portable information terminal or other child apparatus does not have a memory for content data storage is established within a limited region such as a LAN (Local Area Network) system and can be suitably applied to a system in which the parent apparatus and child apparatus can constantly communicate with each other.

In the present embodiment, which has been described earlier, the hard disk recording apparatus, which serves as the parent apparatus, can be hard-wire connected to the portable information terminal, which serves as the child apparatus. However, the present invention is not limited to the use of such a connection method. It goes without saying that radio wave-based, light-based, or other wireless communication can be established to connect the hard disk recording apparatus or other parent apparatus to the portable information terminal or other child apparatus.

It is assumed that the present embodiment, which has been described earlier, acquires content data mainly by automatically receiving and selecting broadcast programs. However, the present invention is not limited to the use of such a content data acquisition method. The present invention is also applicable to a case where content data supplied through the Internet or other wide-area network is searched to locate content data matching the user's preference, download the located content data, and store the downloaded content data on a HDD.

The aforementioned preference database 1, recording history data 2, style database 3 (which includes the time database 31 and program-related database 32), reproduction data, and deletion history data are merely examples. The number of pieces of information to be retained can be increased or decreased.

The preference database 1 should be a collection of data that are necessary for selecting a target broadcast program. The style database 3 should include the information for determining how the user uses the portable information terminal 200 as well as the information instrumental in extracting content data. All databases and the data contained in the data files are applicable to the present invention as far as they contain necessary data for achieving the purpose. The present invention is not limited to the use of data described in conjunction with the present embodiment, which has been described earlier.

It should be understood by those skilled in the art that various modifications, combinations, sub-combinations, and alterations may occur depending on design requirements and other factors insofar as they are within the scope of the appended claims or the equivalents thereof.

What is claimed is:

1. A content use system, including:
   a recording apparatus configured to store a first content data; and
   a portable reproducing apparatus configured to reproduce a second content data,
   wherein the recording apparatus comprises:
      storage means for storing the first content data;
      reproduction history information acquisition means for acquiring reproduction history information about a reproduction period of the second content data from the portable reproducing apparatus;
      content data extraction means for extracting the first content data in accordance with the reproduction period of the second content data; and
      content data transfer means for transferring the first content data to the portable reproducing apparatus, and
   wherein the portable reproducing apparatus comprises:
      content data acquisition means for acquiring the first content data from the recording apparatus;
   reproduction history information generation means for generating a reproduction start time of the second content data in accordance with a time at which a reproduction of the second content data is started and for generating a reproduction stop time of the second content data in accordance with a time at which the reproduction of the second content data is stopped; and
   reproduction history information transfer means for transferring the reproduction history information about the reproduction period of the second content data to the recording apparatus, the reproduction period of the second content data being a period extending from the reproduction start time of the second content data to the reproduction stop time of the second content data.

2. The content use system according to claim 1, wherein the recording apparatus further comprises:
   broadcast signal reception means for receiving a broadcast signal;
   broadcast signal reception control means for controlling a reception of the broadcast signal in accordance with the reproduction period of the second content data; and
   recording means for recording the received broadcast signal in the storage means as the first content data.

3. A recording apparatus configured to transfer first content data to a portable reproducing apparatus, the recording apparatus comprising:
   storage means for storing the first content data;
   reproduction history information acquisition means for acquiring reproduction history information about a reproduction period of second content data from the portable reproducing apparatus, the reproduction period of the second content data being a period extending from a reproduction start time of the second content data to a reproduction stop time of the second content data;
   content data extraction means for extracting the first content data stored in the storage means in accordance with the reproduction period of the second content data, the reproduction start time of the second content data corresponding to a time at which a reproduction of the second content data was started, the reproduction stop time of the second content data corresponding to a time at which the reproduction of the second content data was stopped; and
   content data transfer means for transferring the first content data to the portable reproducing apparatus.

4. The recording apparatus according to claim 3, further comprising:
   broadcast signal reception means for receiving a broadcast signal;
   broadcast signal reception control means for controlling a reception of the broadcast signal in accordance with the reproduction period of the second content data; and
   recording means for recording the broadcast signal in the storage means as the first content data.

5. A portable reproducing apparatus for reproducing a first content data that is transferred from a recording apparatus, the portable reproducing apparatus comprising:
   content data acquisition means for acquiring the first content data from the recording apparatus;
   reproduction history information generation means for generating a reproduction start time of a second content data in accordance with a time at which a reproduction of the second content data is started and for generating a reproduction stop time of the second content data in accordance with a time at which the reproduction of the second content data is stopped, a reproduction period of the second content data being a period extending from the reproduction start time of the second content data to the reproduction stop time of the second content data; and
   reproduction history information transfer means for transferring information indicating the reproduction period of the second content data to the recording apparatus,
   wherein the first content data is associated with the reproduction period of the second content data.

6. A system control method for use in a content use system that includes a recording apparatus configured to store first content data and a portable reproducing apparatus configured to reproduce the first content data transferred from the recording apparatus, the system control method comprising:
   controlling storage of the first content data at the recording apparatus;
   acquiring reproduction history information about a reproduction period of second content data from the portable reproducing apparatus, the reproduction period of the second content data being a period extending from a reproduction start time of the second content data to a reproduction stop time of the second content data;

extracting the first content data in accordance with the reproduction period of the second content data;

transferring the first content data to the portable reproducing apparatus;

acquiring the first content data from the recording apparatus;

generating the reproduction start time of the second content data in accordance with a time at which a reproduction of the second content data is started; and generating the reproduction stop time of the second content data in accordance with a time at which the reproduction of the second content data is stopped;

transferring the reproduction history information about the reproduction period of the second content data to the recording apparatus.

7. The system control method according to claim 6, further comprising:

controlling a reception of a broadcast signal in accordance with the reproduction history information;

receiving the broadcast signal at the recording apparatus; and recording the broadcast signal in a storage as the first content data.

8. A content use system, including:

a recording apparatus configured to store a first content data; and a portable reproducing apparatus configured to reproduce a second content data, wherein the recording apparatus comprises:

a storage section configured to store the first content data;

a reproduction history information acquisition section configured to acquire reproduction history information about a reproduction period of the second content data from the portable reproducing apparatus, the reproduction period of the second content data being a period extending from a reproduction start time of the second content data to a reproduction stop time of the second content data;

a content data extraction section configured to extract the first content data stored in the storage section in accordance with the reproduction period of the second content data; and a content data transfer section configured to transfer the first content data to the portable reproducing apparatus, and wherein the portable reproducing apparatus comprises:

a content data acquisition section configured to acquire the first content data from the recording apparatus;

a reproduction history information generation section configured to generate the reproduction start time of the second content data in accordance with a time at which a reproduction of the second content data is started and to generate the reproduction stop time of the second content data in accordance with a time at which the reproduction of the second content data is stopped; and a reproduction history information transfer section configured to transfer the reproduction history information about the reproduction period of the second content data to the recording apparatus.

9. A recording apparatus configured to transfer first content data to a portable reproducing apparatus, the recording apparatus comprising:

a storage section configured to store the first content data;

a reproduction history information acquisition section configured to acquire reproduction history information about a reproduction period of second content data from the portable reproducing apparatus, the reproduction period of the second content data being a period extending from a reproduction start time of the second content data to a reproduction stop time of the second content data;

a content data extraction section configured to extract the first content data stored in the storage section in accordance with the reproduction period of the second content data, the reproduction start time of the second content data corresponding to a time at which a reproduction of the second content data was started, the reproduction stop time of the second content data corresponding to a time at which the reproduction of the second content data was stopped; and a content data transfer section configured to transfer the first content data to the portable reproducing apparatus.

10. A portable reproducing apparatus configured to reproduce first content data that is transferred from a recording apparatus, the portable reproducing apparatus comprising:

a content data acquisition section configured to acquire the first content data from the recording apparatus;

a reproduction history information generation section configured to generate a reproduction start time of a second content data in accordance with a time at which a reproduction of the second content data is started and to generate a reproduction stop time of the second content data in accordance with a time at which the reproduction of the second content data is stopped, a reproduction period of the second content data being a period extending from the reproduction start time of the second content data to the reproduction stop time of the second content data; and a reproduction history information transfer section configured to transfer information indicating the reproduction period of the second content data to the recording apparatus, wherein the first content data is associated with the reproduction period of the second content data.

11. The recording apparatus according to claim 3, wherein, the reproduction history information acquisition means acquires information indicating a deletion history interval extending from a time at which the second content data was transferred to the portable reproducing apparatus to a time at which the second content data was deleted from the portable reproducing apparatus, and the content data extraction means extracts the first content data based on the deletion history interval.

* * * * *